(12) United States Patent
Welch et al.

(10) Patent No.: US 6,298,829 B1
(45) Date of Patent: Oct. 9, 2001

(54) DIRECTLY ACTUATED INJECTION VALVE

(75) Inventors: Alan B. Welch; Irawan Rahardja; Mike Hebbes, all of Vancouver (CA)

(73) Assignee: Westport Research Inc., Vancouver (CA)

(*) Notice: Subject to any disclaimer, the term of this patent is extended or adjusted under 35 U.S.C. 154(b) by 0 days.

(21) Appl. No.: 09/522,130

(22) Filed: Mar. 9, 2000

Related U.S. Application Data (60) Provisional application No. 60/159,791, filed on Oct. 15, 1999.

(51) Int. Cl.⁷ ................................... F02M 41/00
(52) U.S. Cl. ............................ 123/467; 123/472
(58) Field of Search ................................... 123/498, 497, 123/467, 472, 478; 251/129.06; 239/533.2, 533.9; 293/102.2

(56) References Cited

U.S. PATENT DOCUMENTS

| | | | |
|---|---|---|---|
| 3,598,506 | * 8/1971 | O'Neill | 417/383 |
| 4,022,166 | * 5/1977 | Bart | 123/32 |
| 4,101,076 | * 7/1978 | Bart | 239/584 |
| 4,158,368 | 6/1979 | Clark | 137/487.5 |
| 4,725,002 | 2/1988 | Trachte | 239/102.2 |
| 4,726,389 | 2/1988 | Minoura et al. . | |
| 4,803,393 | * 2/1989 | Takahashi | 310/328 |
| 4,813,601 | 3/1989 | Schwerdt et al. | 239/91 |
| 5,031,841 | 7/1991 | Schafer | 239/585 |
| 5,035,360 | 7/1991 | Green et al. | 239/585 |
| 5,697,554 | 12/1997 | Auwaerter et al. | 239/88 |
| 5,779,149 | 7/1998 | Hayes, Jr. | 239/124 |
| 5,819,710 | 10/1998 | Huber | 123/498 |
| 5,821,671 | * 10/1998 | Trzmiel | 310/328 |
| 5,845,852 | 12/1998 | Waldman et al. | 239/533.8 |
| 5,875,764 | 3/1999 | Kappel et al. | 123/467 |
| 5,917,692 | 6/1999 | Schmitz et al. . | |
| 6,062,533 | 5/2000 | Kappel et al. | 251/57 |

FOREIGN PATENT DOCUMENTS

| | | |
|---|---|---|
| 197 27 992 | 1/1999 | (DE) . |
| 0 376 493 | 7/1990 | (EP) . |
| 2 321 278 | 8/1998 | (EP) . |
| 09-324723 | 12/1997 | (JP) . |
| 10-009084 | 1/1998 | (JP) . |
| WO 85/02445 | 6/1985 | (WO) . |

\* cited by examiner

*Primary Examiner*—Henry C. Yuen
*Assistant Examiner*—Mahmoud Gimie
(74) *Attorney, Agent, or Firm*—McAndrews, Held & Malloy, Ltd.

(57) ABSTRACT

A directly actuated injection valve comprises a hollow valve housing, a valve needle disposed within the hollow interior, a needle spring, an actuator assembly, and a hydraulic link assembly. The valve needle is movable between a closed position and an open position for governing the flow of fuel into the combustion chamber of an internal combustion engine. The displacement of the valve needle from the closed position is defined as the lift. The a needle spring biases the valve needle in the closed position. The actuator assembly generates an opening force that acts against the needle spring to open the valve. The hydraulic link assembly is interposed between the valve needle and the needle spring and the actuator assembly. The hydraulic link assembly transmits respective closing and opening forces to the valve needle. The hydraulic link preferably comprises a piston disposed within a cylinder that is filled with a hydraulic fluid. The opening and closing forces are transmitted through a thickness of the hydraulic fluid that is trapped between the planar surfaces of the piston and the head and base of the hydraulic cylinder. In the preferred embodiment, the thickness of the hydraulic fluid trapped between the piston and cylinder head or base is automatically adjustable in response to changes in the dimensional relationship between components of the injection valve to maintain a desired valve needle lift when the actuator assembly is activated. When the actuator assembly comprises a magnetostrictive or piezoelectric member, the movements of the valve needle can be controlled by the application of a shaped control pulse or waveform to improve the speed of the opening and closing motion of the valve needle, and to reduce the impact of the valve needle on the valve seat upon closing.

32 Claims, 5 Drawing Sheets

DIRECTLY ACTUATED INJECTION VALVE

CROSS-REFERENCE TO RELATED APPLICATION(s)

The present application relates to and claims priority benefits from U.S. Provisional Patent Application Serial No. 60/159,791 filed Oct. 15, 1999, entitled "Directly Actuated Injector", which is incorporated by reference in its entirety.

TECHNICAL FIELD

The present invention relates generally to high pressure fuel injection valves or injectors for internal combustion engines, and, more specifically, to an injection valve that is directly controllable by a position activating material (such as, for example, a piezoelectric or magnetostrictive material) and which includes a passive hydraulic link.

BACKGROUND

Direct injection of a gaseous fuel into the combustion chamber of an internal combustion engine is desirable for several reasons. For example, direct injection allows charge stratification, eliminating throttling losses associated with homogeneous charge engines. Additionally, with direct injection late in the compression stroke, a high-compression ratio can be maintained, maintaining efficiency. Further, when the fuel that is directly injected comprises natural gas, propane, or hydrogen, the emissions of $NO_x$ and particulate matter (PM) are significantly reduced. The directly injected gaseous fuel can be ignited with a glow plug, with a spark plug or with pilot diesel fuel. The gaseous fuel needs to be injected at high pressure to overcome the combustion chamber pressure, which is high at the end of the compression stroke. Preferably, the injection pressure is high enough to promote good mixing between the injected fuel and the combustion chamber air.

Direct injection at high pressures presents several challenges. The use of high pressure fuels for direct injection results in high fuel pressures existing within the injection valve or injector. As a result, the injection valve must typically be strongly seated to avoid leakage of the fuel into the combustion chamber between injection events. The valve is "seated" when the valve is closed, for example, in a needle valve, when the sealing surfaces of the valve needle and the valve seat are in fluid-tight contact with each other. Moreover, compared to low-pressure systems, higher forces are needed to open the injection valve. For example, for a needle valve that employs an inwardly opening valve needle, when the needle is in the open position it may be subjected to high forces from the pressurized fuel. Additionally, there is only a small window of time during which the fuel can be injected. For example, at 4500 revolutions per minute (RPM), at full load, all of the fuel is preferably injected in less than 2–3 milliseconds.

Nearly all prior direct fuel injection systems in internal combustion engines have been hydraulically-actuated. These systems rely on a hydraulic fluid to provide the force that is needed to open an injection valve (or valves, when the engine comprises a plurality of combustion chambers). Accordingly, at typical engine operating speeds, hydraulically actuated injectors rely on rapid changes in the hydraulic fluid pressure to open and close the injection valve(s). An injection valve is typically opened by increasing the hydraulic fluid pressure and closed by reducing the hydraulic fluid pressure, such that the opening force applied to the injection valve is reduced, causing the valve to close. However, in the context of a conventional gaseous injector, hydraulic operation presents several drawbacks, including:

- the need for additional hydraulic hardware such as a hydraulic pump, valves, and a reservoir for the hydraulic fluid;
- the need for a seal to be established between the variable pressure hydraulic fluid and the high pressure gaseous fuel;
- increased bulkiness of the injection valve assembly because of the additional hardware requirements; and
- delayed response of the system due to time delay of the hydraulic fluid between the electrical valve hardware and the needle that controls gas flow from the injector.

Moreover, the degree of controllability of the movement of the injection valve is low when the motive force is provided by a pressurized fluid rather than by a directly controllable source. In this respect, it is difficult to do lift control, with some limited capabilities when using double-spring configuration. Therefore, it is desirable to avoid the use of hydraulics to operate gas injectors, particularly for high-speed engines. "Lift" in the context of needle valves is defined herein as the displacement of the valve needle away from its closed/seated position to its open position.

In response to at least some of the drawbacks with hydraulic activation, solenoid actuators have been considered as an alternative for injection valve actuation because of the simplicity and reliability of solenoids. For example, U.S. Pat. No. 5,035,360 (the '360 patent) discloses a directly actuated gas only injector employing a solenoid actuator. However, the application disclosed for the solenoid actuator is an injection valve for a two-stroke engine with an operating speed of 2100 RPM. The '360 patent discloses introducing fuel into the piston cylinder between the times during the engine cycle when the piston is at approximately bottom dead center and 60 degrees after bottom dead center. The '360 patent further discloses injecting fuel at a pressure of about 300 pounds per square inch (psi) (about 2.1 MPa). Accordingly, the fuel is not introduced at pressures as high as the pressure when the piston is at or near top dead center, for example, at pressures of 3,000 psi (21 MPa) and higher. For a constant needle diameter, higher fuel pressures require higher actuating forces and to increase the actuating force of a solenoid it must be made larger. The '360 patent also discloses that "large solenoids of conventional type are inherently slower than small ones". Thus solenoid actuators are not suitable for applications that require a combination of fast response times and high actuating forces, such as, for example, injectors used for high-pressure fuels. Solenoids also do not effectively deliver small amounts of fuel, such as the amount needed at low loads, and particularly at high-speed. For higher speed engines (for example, engines running at 3000 RPM and higher), the minimum opening time of the needle tends to be too long for delivering only a small amount of fuel. The shortest known opening time for solenoid actuated injection valves is about 700 microseconds. Additionally, while solenoid actuators are capable of substantial lift, of the order of 20-thousandths of an inch (500 micron) or more, they do not permit control of the lift. Conventional solenoid technology is only known to be able to offer duration control (how long the valve is open for) and not position control (how much the valve is lifted).

It is also known to use piezoelectric or magnetostrictive actuation (devices which can change their dimensions under the effect of an electric or magnetic field) for directly actuated injection valves. For example, U.S. Pat. No. 5,031,841 (the '841 patent) describes a metering valve using an actuating member, which according to the patent could be a piezoelectric stack or a magnetostrictive actuator. One feature disclosed by the '841 patent is the addition of a diaphragm which has the dual purpose of acting as a spring biasing the valve in its closed position and of providing a seal between the metered fluid and the actuator. The '841 patent discloses an adjusting screw for mechanically setting the position of the actuator within the housing. According to the '841 patent, the valve needle is rigidly connected to the actuator by a pressure pin.

Piezoelectric or magnetostrictive actuation devices have also been used in injection valves to actuate an internal hydraulic control valve. For example, U.S. Pat. No. 5,819,710 (the '710 patent) describes an injection valve within which a servo valve is used. The servo-valve is actuated by an actuating member, which could be a piezoelectric stack or a magnetostrictive material. The actuating member can be controlled to close the servo valve gently to reduce wear and improve service life. According to the '710 patent, the servo valve actuating member can be paired with a insert bolt or stud to compensate for differences in thermal expansion between the actuator and the injector housing. (See column 4, lines 25–48).

U.S. Pat. No. 5,845,852 (the '852 patent) describes another injector that employs a piezoelectric actuator to operate an internal three-way hydraulic control valve to open and close the main injection check valve. The '852 patent describes a piezoelectric actuator acting through the intermediate of a self-locking preload assembly. This self-locking preload assembly has three functions: (i) to compensate for dimensional changes and/or imperfections; (ii) to offset some of the upward force due to fuel pressure; and, (iii) to preload the piezoelectric stack for better performance.

Similarly, U.S. Pat. No. 5,779,149 describes an injector using a piezoelectric actuator acting on a hydraulic control valve through the intermediate of a hydraulic amplifier, which serves to amplify the movement of the actuator. The hydraulic control valve allows the main injection valve to open and close to meter the amount of fuel injected.

A problem with employing a piezoelectric or magnetostrictive actuator to operate a control valve, which in turn controls the flow of a hydraulic fluid to operate an injection valve, is that this arrangement requires the intermediate action of a hydraulic fluid. Any delays caused by the displacement of the hydraulic fluid causes delays in the actuation of the injector. Accordingly, there is a need for an injector that is directly actuated by an actuator without an intermediate active hydraulic operator generating any actuating forces. Another disadvantage of active hydraulically operated systems is that a hydraulic fluid needs to be supplied and drained from a hydraulic cylinder. When diesel fuel is the main fuel used by the engine, the diesel fuel may be used as the hydraulic fluid. However, when a gaseous fuel is the engine's main fuel, a separate hydraulic fluid system would be needed to operate injectors that rely on hydraulic actuation.

SUMMARY

An injection valve injects fuel into a combustion chamber of an internal combustion engine. The injection valve comprises:
(a) a valve housing comprising:
 a fuel inlet port;
 an interior chamber fluidly connected to the fuel inlet port;
 a nozzle comprising a nozzle orifice providing a fluid passage from the interior chamber to the combustion chamber;

(b) a valve needle disposed within the valve housing wherein the valve needle is movable between a closed position at which a sealing end of the valve needle contacts a valve seat to fluidly seal the interior chamber from the nozzle orifice, and an open position at which the sealing end of the valve needle is spaced apart from the valve seat whereby the interior chamber is fluidly connected with the nozzle orifice, wherein valve needle lift equals the distance traveled by the sealing end away from the valve seat;
(c) a needle spring associated with the valve needle, wherein the needle spring applies a closing force to the valve needle for biasing the valve needle in the closed position;
(d) an actuator assembly associated with the valve needle, wherein the actuator assembly may be activated to apply an opening force to the valve needle stronger than the closing force, for moving the valve needle to the open position; and
(e) a hydraulic link assembly comprising a hydraulic link having a fluid thickness through which the opening and closing forces are transmitted, wherein the thickness of the hydraulic link is adjustable in response to changes in the dimensional relationship between components of the injection valve to maintain a desired valve needle lift when the actuator assembly is activated.

In a preferred embodiment, the thickness of the hydraulic link is auto-adjustable in response to changes in the dimensional relationship caused by differential thermal expansion, and/or wear to components of the injection valve. The hydraulic link assembly preferably comprises a sealed hydraulic cylinder, with a piston and hydraulic fluid disposed within the hydraulic cylinder. The piston may be an integral part of the valve needle.

The actuator assembly preferably comprises a magnetostrictive member or a piezoelectric stack. When the actuator assembly comprises a magnetostrictive member, an electric coil is disposed around the magnetostrictive member and a flux tube is disposed around the electric coil. In preferred arrangements, the actuator assembly may be disposed within the interior chamber of the injection valve. In a particular preferred embodiment, the actuator assembly is tubular and disposed within an annular space around a cylindrical portion of the valve needle. One end of the tubular actuator assembly may be held in a fixed position in relation to the valve housing by a pole that supports the magnetostrictive member. The pole is attached to the valve housing to prevent movement of the supported end of the magnetostrictive member when the actuator assembly is activated.

When the injection valve actuator assembly employs a magnetostrictive member or a piezoelectric stack, the actuator assembly is controllable to control the desired lift between 10 and 100 percent of maximum lift. That is, the control pulse directed to the actuator assembly can be modulated to provide full or partial lift, as desired. When the actuator assembly comprises a magnetostrictive member, the control pulse is a modulated electric current directed to an electric coil that produces a magnetic field. When the actuator assembly comprises a piezoelectric stack, the control pulse is a modulated voltage applied to the piezoelectric stack.

The present injection valve is particularly suited for injecting a gaseous fuel because the ability to modulate the movement of the valve needle may be beneficially used to slow down the closing action of the valve needle to reduce impact upon closing. When a liquid fuel is injected, the closing impact is dampened by the displacement of the thin liquid fuel layer, which is considerably denser than gaseous fuels. When the fuel is a gaseous fuel, it can be injected into the combustion chamber at a pressure greater than about 2000 psi (about 13.8 MPa).

A magnetostrictive material that is suitable for use in the present injection valve comprises a material known as ETREMA Terfenol-D® magnetostrictive alloy that is available from Etrema Products Inc. ETREMA Terfenol-D® magnetostrictive alloy is a metal alloy composed of the elements terbium, dysprosium, and iron.

In a preferred embodiment, the valve needle, actuated by a magnetostrictive or piezoelectric actuator assembly is controllable to move between the closed and open positions in less than about 250 microseconds.

To improve the range of valve lift for a given magnetostrictive or piezoelectric actuator length, a compressive force may be applied to the magnetostrictive member or piezoelectric stack. By pre-loading magnetostrictive members and piezoelectric stacks, net displacement may be increased per respective unit of applied magnetic field or applied voltage. Accordingly, a compression spring member may be employed for applying a compressive force to pre-load the magnetostrictive member or piezoelectric stack. In a preferred embodiment, the compression spring member comprises at least one disc spring (also known as a Belleville spring or Belleville washer).

The injection valve housing may comprise a plurality of parts that are joined with each other to provide a fluidly sealed body. For example, the valve housing may comprise a hollow main housing with a removable valve cap that allows access to the valve components disposed within the main housing. The valve housing may further comprise a separate valve tip so that it is replaceable when worn. In addition, the valve tip may be designed so that it is the only portion of the valve body that is directly exposed to the interior of the combustion chamber. In this case the valve tip may be made from a material that will provide greater durability when directly exposed to the conditions that might be expected within a combustion chamber.

While the hydraulic link is designed to compensate for changes in the dimensional relationships between valve components, including changes caused by differential thermal expansion, the demands placed upon the hydraulic link may be reduced by the selection of materials for the valve components that have similar thermal expansion coefficients.

A preferred fuel injection valve for an internal combustion engine comprises:
  (a) a valve housing comprising:
    a fuel inlet port;
    an interior chamber fluidly connected to the fuel inlet port;
    a nozzle comprising a valve seat and a nozzle orifice providing a fluid passage from the interior chamber to the combustion chamber;
  (b) a valve needle comprising a cylindrical portion having a sealing end and a piston portion having a pre-load end, the valve needle disposed within the valve housing wherein the valve needle is movable between a closed position at which the sealing end contacts the valve seat to fluidly seal the interior chamber from the nozzle orifice, and an open position at which the sealing end is spaced apart from the valve seat whereby the interior chamber is fluidly connected with the nozzle orifice, wherein valve needle lift equals distance traveled by the sealing end away from the valve seat;
  (c) a needle spring associated with the pre-load end of the valve needle, wherein the needle spring is compressed to apply a closing force to the valve needle for biasing the valve needle in the closed position;
  (d) an actuator assembly that may be activated to apply an opening force to the valve needle that is stronger than the closing force, for moving the valve needle to the open position, the actuator assembly comprising:
    a tubular magnetostrictive member disposed around the cylindrical portion of the valve needle;
    an electrical coil disposed around the magnetostrictive member;
    a flux tube disposed around the electrical coil; and
    a support for the actuator assembly that acts as a pole and provides a fixed position for one end of the magnetostrictive member relative to the valve housing; and
  (e) a hydraulic link assembly comprising a sealed hydraulic cylinder disposed about the piston portion of the valve needle, a hydraulic fluid disposed within the hydraulic cylinder, wherein the opening and closing forces applied to the valve needle are transmitted through the thickness of hydraulic fluid whereby the hydraulic fluid acts as a hydraulic link and the thickness is automatically adjustable in response to changes in the dimensional relationship between components of the injection valve to maintain a desired valve needle lift when the actuator assembly is activated.

Also provided is a method of using a shaped waveform to control an injection valve that employs a magnetostrictive or piezoelectric actuator assembly. The method comprises, in sequence:
  (a) initiating an injection event by applying a control pulse and accelerating valve opening by raising the value of the control pulse to a spike value that is greater than the value required for the desired lift (the spike value may be up to about an order of magnitude higher than the value required for the desired lift);
  (b) reducing the control pulse from the spike value to a value that is needed to provide the desired lift;
  (c) reducing the control pulse to a negative value to accelerate valve closing;
  (d) increasing the control pulse to a positive value to slow down valve closing to reduce the impact force of the valve needle on the valve seat; and
  (e) reducing the control pulse to zero to close the valve.

The method may further comprise shaping the waveform to modulate the movement of the valve needle, for example, to provide only partial lift when reduced fuel flow is desired. This result could be achieved, for example, by momentarily reducing the control pulse to a value that is lower than the value that is needed for the desired lift to reduce the average value of the control pulse during the injection event. The reduction in the control pulse value is preferably timed immediately after increasing the control pulse to the spike value, so that the reduced control pulse helps to stop the opening action of the valve needle.

When the actuator assembly employs a magnetostrictive member, the control pulse is a modulated electric current directed to an electric coil that produces a magnetic field oriented in the direction of actuation. When the actuator assembly employs a piezoelectric stack, the control pulse is a modulated voltage applied to the piezoelectric stack.

In the preferred method, the time needed to move the valve needle between the closed position and the desired open position may be as short as about 175 microseconds. More typically, however, the time needed to move the valve needle between the closed position and the desired open position may be as short as about 250 microseconds.

An advantage of the present injection valve is that it may be employed for late-cycle high-pressure direct injection of fuels into internal combustion engines. For example, the present injection valve may be used to inject a gaseous fuel into the combustion chamber of an internal combustion engine at pressures of between about 2000 and 5000 psi (about 13.8 and 34.5 MPa). The present injection valve may be employed to introduce liquid fuels into internal combustion engines at even higher pressures.

Still another advantage of the present injection valve is that it provides an injection valve that eliminates the need for an active hydraulic operator and the associated high-pressure hydraulic system for generating the actuation force to actuate the injection valve. Conventional active hydraulic operators are different from the hydraulic link of the present invention, which may be described as a passive hydraulic link because the hydraulic fluid sealed within the hydraulic link assembly merely transmits the actuating forces but is not employed to generate an actuating force for actuating the valve. Rather, the purpose of the hydraulic link is to provide a load path for the opposing actuating forces that originate from at least one spring member and the actuator assembly. A benefit of eliminating the need for a conventional active hydraulic operator is the elimination of the associated active hydraulic systems. Conventional active hydraulic actuators, such as those that employ rapidly increasing and decreasing hydraulic fluid pressure to actuate an injection valve need to be connected to a source of high pressure hydraulic fluid and need valves for controlling the flow of hydraulic fluid in and out of the active hydraulic operator. Active hydraulic actuators employ hydraulic fluid that is moved in and out of a hydraulic cylinder and when the hydraulic cylinder is fluidly connected to a source of high pressure hydraulic fluid, the high pressure hydraulic fluid that flows into the hydraulic cylinder generates the actuating force that is used to move the valve needle. The actuating force is removed when the hydraulic cylinder is disconnected from the source of high-pressure hydraulic fluid and the hydraulic fluid is drained from the hydraulic cylinder. A disadvantage of active hydraulic actuators of this type is that there is a lag time associated with moving the hydraulic fluid into and out of the hydraulic cylinder.

A further advantage of the passive hydraulic link is that it may be employed to correct for differential thermal expansion, wear and dimensional variability within permitted manufacturing and assembly tolerances. The disclosed passive hydraulic link accomplishes this by auto-adjusting itself in response to these effects by allowing movement of hydraulic fluid between opposite sides of the hydraulic piston. The actuator assembly thus re-zeroes itself to ensure that the desired valve needle lift is maintained.

An advantage of employing a directly actuated injection valve is that a shaped control pulse may be employed to control the acceleration and deceleration of the valve needle as it moves between the open and closed positions. For example, when a magnetostrictive actuator is employed, the current applied to the electromagnetic coil can be controlled, for example, to reduce the current in a manner that will close the valve gently. Similarly, when a piezoelectric actuator is employed, the voltage applied to the piezoelectric stack can be controlled, for example, to accelerate the opening of the valve by initially providing an overvoltage (that is, a voltage that is higher than the voltage that is needed to provide the necessary displacement). Thus, control pulses may be employed to control the expansion and contraction of magnetostrictive or piezoelectric actuators to control the movement of the valve needle. An advantage of controlling the deceleration of the valve needle is that the impact of the valve needle on the valve seat upon closing can be reduced to reduce the wear on the valve components, thereby improving durability.

Yet another advantage of the present injection valve is that the control pulse may be shaped to provide for partial lifting of the valve needle in a repeatable manner. The amount of lift may be controlled by shaping the control pulse to control the amount of electrical current or voltage directed to the respective magnetostrictive or piezoelectric actuator assembly.

Still another advantage of the disclosed injection valve is that the actual valve needle lift is very small (typically much less than 0.1 millimeter), so that compared to valves designed for greater valve needle lift, the valve needle velocity required to open the present injection valve is much less.

These and other advantages are provided by a directly actuated injector as described below.

DETAILED DESCRIPTION OF PREFERRED EMBODIMENT(S)

Figure 1:
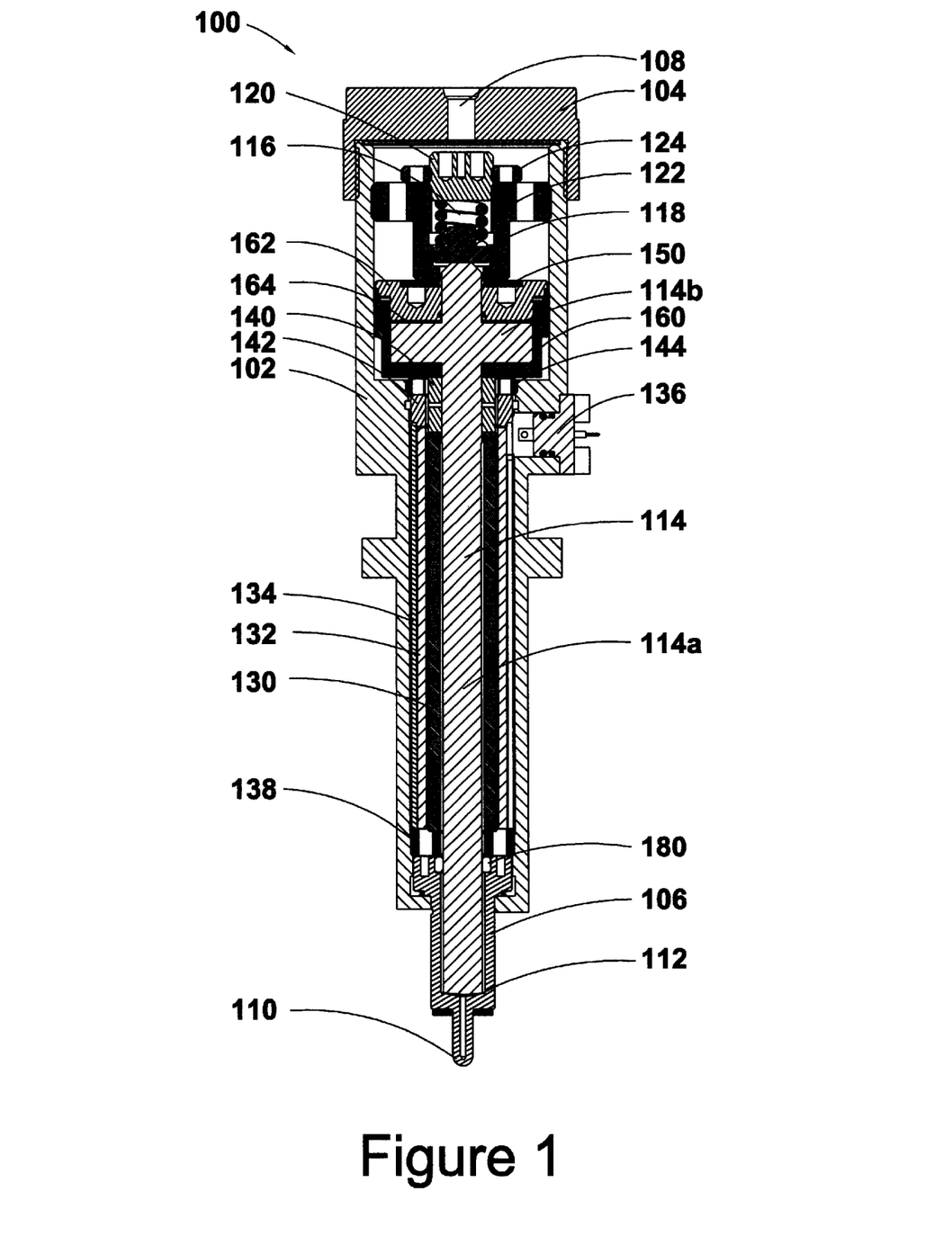
FIG. 1 is a cross-sectional view of a preferred embodiment of a directly actuated fuel injection valve.
Figure 2:
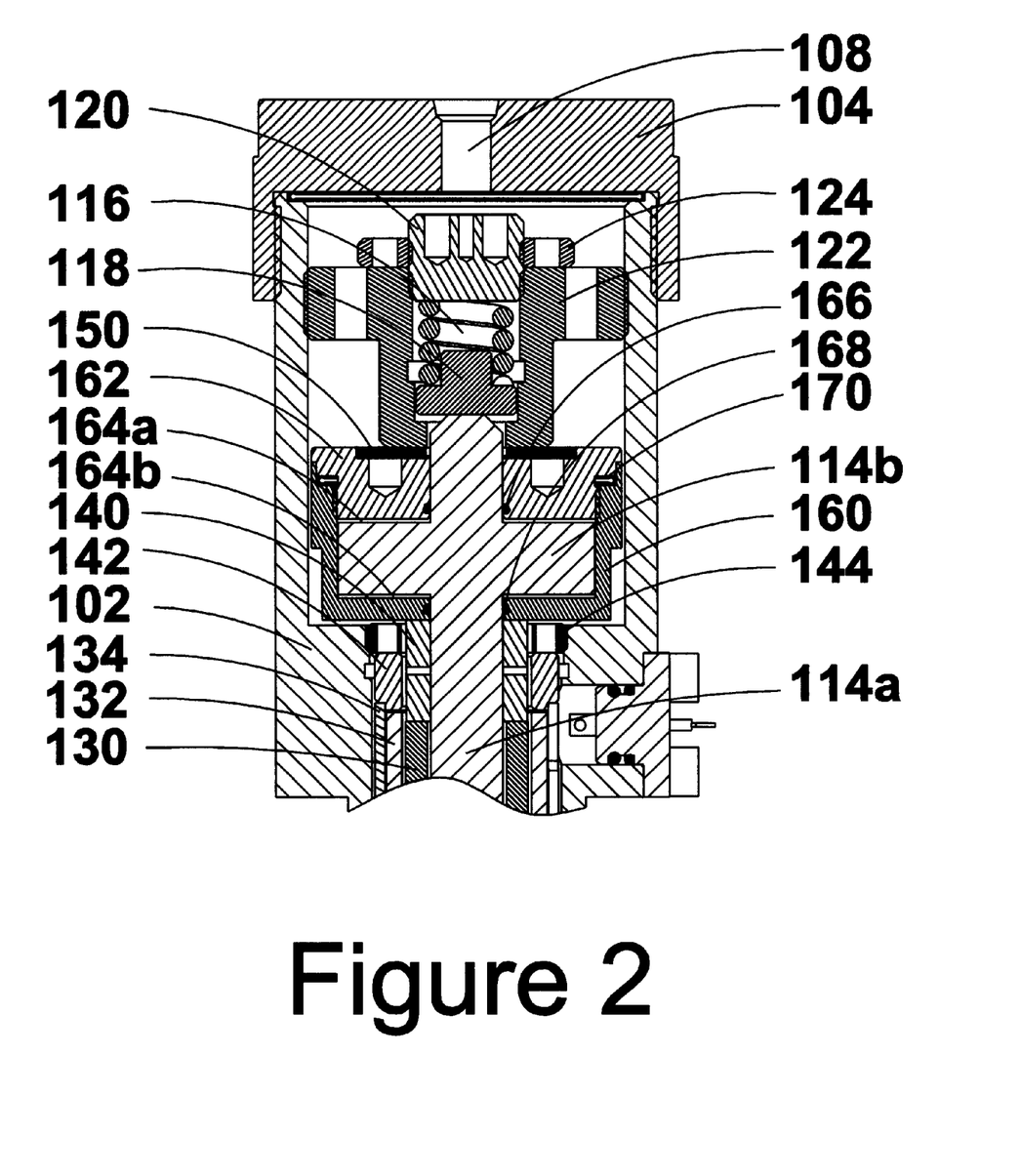
FIG. 2 is an enlarged view of an upper portion of the fuel injection valve of FIG. 1.
Figure 3:
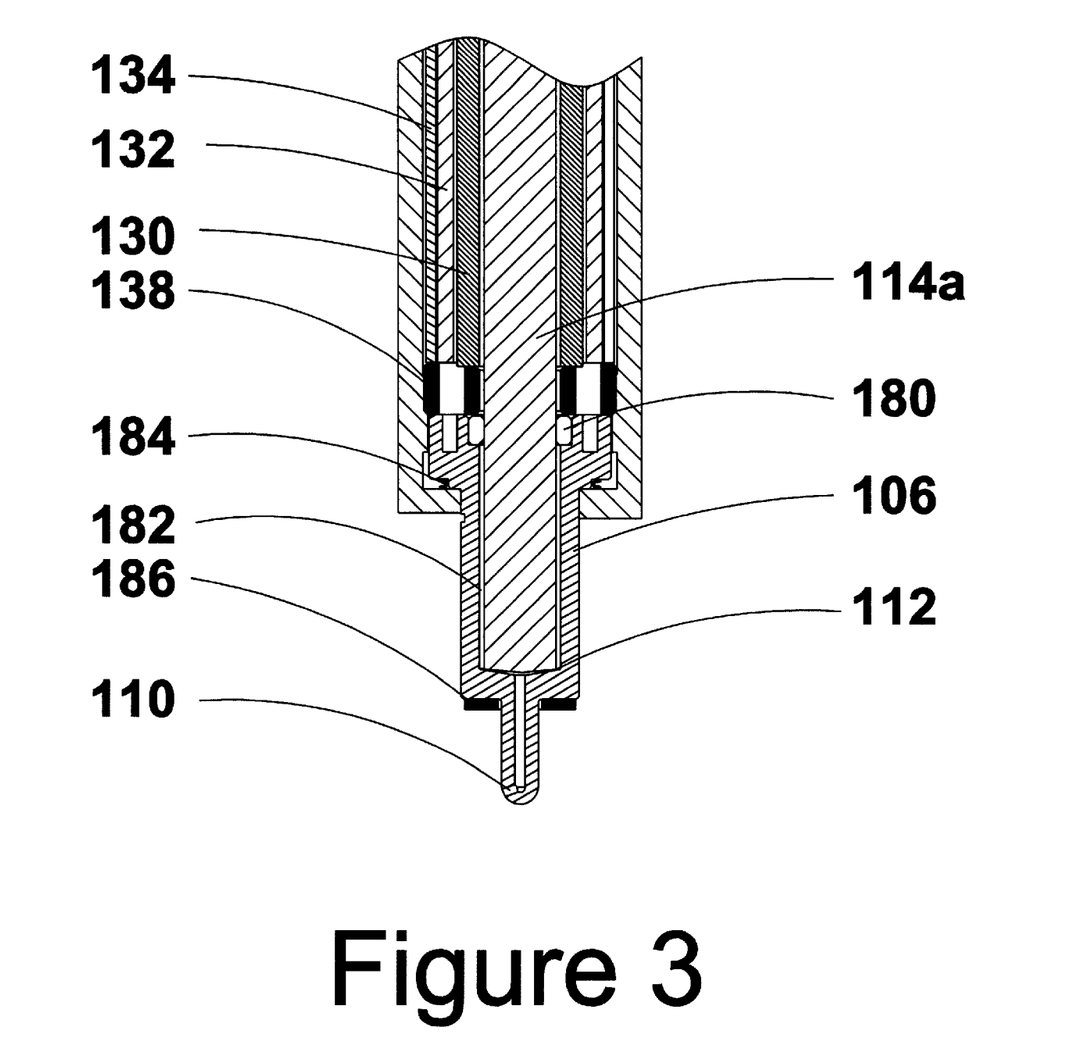
FIG. 3 is an enlarged view of a lower portion of the fuel injection valve of FIG. 1.

FIGS. 1 through 3 show a preferred embodiment of a directly actuated fuel injection valve 100 for internal combustion engines. Injection valve 100 includes elongated valve housing 102 that cooperates with valve cap 104 and valve tip 106 to provide a fluidly sealed valve body. Seals may be employed to ensure that the assembled valve body is fluid-tight. Valve cap 104 comprises inlet port 108 through which fuel enters the valve body, and valve tip 106 comprises at least one nozzle orifice 110 through which fuel exits the valve body. Valve tip 106 further comprises valve seat 112.

In the preferred embodiment, shown more clearly in the enlarged view of FIG. 3, valve seat 112 is angled to maximize fluid flow following the sealing area (where valve needle 114 contacts valve seat 112). The differential angle between the end surface of valve needle 14 and valve seat 112 is chosen so that the flow area does not decrease as gas moves inward toward the central throat of valve tip 106 that feeds nozzle orifice(s) 100.

Valve Needle

Valve needle 114 is disposed within the interior of the valve body and contacts valve seat 112 to close injection valve 100 by preventing fuel from passing beyond valve seat 112 to nozzle orifice 110. In the embodiment of FIG. 1, valve needle 114 comprises valve stem 114a, which moves into the open position by moving inward within the valve body to lift away from valve seat 112. Valve stem 114a is a cylindrical member and since the valve lift is generally small (for example, about 65 micrometers), the diameter of valve stem 114a is selected to ensure sufficient flow capacity through the valve opening since flow area (A) is proportional to valve stem diameter (that is, A =Π×diameter ×lift). Hence, a small lift can be compensated for by a larger diameter. In the preferred embodiment illustrated by FIG. 1 valve needle 114 further comprises a separate piston member may cooperate with valve needle 114 to provide the same effect. In an alternative arrangement (not shown), a poppet-type valve tip may be used so that downward movement of the valve needle causes it to open. In this alternative arrangement, the actuator assembly is preferably positioned above valve needle 114 so that when the actuator is energized to open the injection valve, a downward force is applied to valve needle 114.

Spring Assembly

A spring assembly biases valve needle 114 in the closed position. In a preferred arrangement, the spring assembly comprises at least one needle spring 116 for providing a closing force to valve needle 114. With reference to embodiment of FIG. 1, the spring assembly further comprises a needle spring guide 118 for transmitting the closing force from needle spring 116 to valve needle 114. Needle spring 116 is held in compression by needle spring adjuster 120, which cooperates with needle spring housing 122 to provide a load path to valve housing 102. In a preferred arrangement, respective threaded surfaces join needle spring adjuster 120 to needle spring housing 122, and needle housing 122 to valve housing 102. After needle spring adjuster 120 has been rotated to compress needle spring 116 to provide the desired pre-load force to needle spring 116, locking nut 124 may be tightened to prevent needle spring adjuster 120 from loosening. The spring energy set by compressing or preloading needle spring 116 provides the closing force for keeping valve needle 114 in the closed position.

Actuator Assembly

An actuator assembly may be activated to provide an opening force that is opposite and greater than the closing force provided by the spring assembly. In the embodiment illustrated in FIG. 1, the actuator assembly comprises a member that expands or contracts in the direction of the opening force when the member is exposed to a magnetic field or subjected to an electrical voltage, such as, for example, a magnetostrictive material or a piezoelectric stack.

In the embodiment illustrated by FIG. 1, the actuator assembly is a magnetostrictive actuator that comprises magnetostrictive member 130, electric coil 132 disposed around the outer diameter of magnetostrictive member 130, a flux tube 134 disposed around electric coil 132. Flux tube 134 may be made from common carbon steel with a lengthwise slit to break eddy currents. An electric current is supplied to electrical fitting 136. Electric leads (not shown) conduct the electric current from electrical fitting 136 to electric coil 132. When an electric current is applied to electric coil 132 a magnetic flux develops that flows through magnetostrictive member 130, pole 138, 140 and 142, and flux tube 134. Poles 138, 140 and 142 are made from a suitable material such as carbon steel (for example CS1018) or steel that has a low magnetic hysteresis. Pole 138 is a "fixed" pole that provides a structural support for a first end of magnetostrictive member 130, electric coil 132 and flux tube 134. Pole 140 is associated with a second end of magnetostrictive member 130 and pole 142 is associated with a second end of electric coil 132 and flux tube 134. Pole 140 is an "inner" pole and pole 142 is an "outer" pole disposed concentrically around inner pole 140. Pole 142, electric coil 132 and flux tube 134 are held in place by lock nut 144, which preferably threads into the inner wall of valve housing 102. Poles 140 and 142 cooperate with one another to provide a flux path at the second end of the actuator assembly, but pole 140 may move relative to pole 142 so that magnetostrictive member 130 may expand in the direction of the magnetic field which is oriented so that the actuator assembly provides an opening force in opposition to the closing force of the spring assembly.

A pre-compression force is preferably applied to magnetostrictive member 130 to amplify the magnitude of expansion when a magnetic field is applied. Pre-compression of magnetostrictive member 130 increases the net displacement per unit of applied magnetic field. Similarly, when a piezoelectric member is substituted for magnetostrictive member 130, pre-compression increases the net displacement of the piezoelectric member per unit of applied electric voltage. A spring, such as, for example, disc spring 150 may be employed to provide the pre-compression force. Alternative compression elements may be employed in place of disc spring 150 to provide the pre-compression force, such as, for example, a coil spring or another type of spring with the same spring force, a hydraulic piston, or a combination of compression elements. When a pre-compression force is employed, the actuator's displacement can increase to about 0.13% of the total length of magnetostrictive member 130. However, the amount of displacement may decline as a function of increasing temperature. For example, at typical reciprocating engine cylinder head temperatures the actual displacement may be about 0.065% of the length of pre-compressed magnetostrictive member 130.

The dimensions of magnetostrictive member are dictated by the requirements of injection valve 100. For example, if injection valve 100 is designed to provide a lift of at least about 65 µm, magnetostrictive member 130 is sized to have a length of at least about 100 mm. Additionally, the wall thickness of annular magnetostrictive member 130 is selected to provide sufficient force to overcome all of the opposing forces that hold injection valve 100 in the closed position. If the cross-sectional area of annular magnetostrictive member 130 is not sufficient, the opposing forces can reduce or prevent longitudinal displacement of magnetostrictive member 130, even when electric coil 132 is fully energized. This mode is known as the "blocked force" mode. Accordingly, the magnitude of the closing forces acting on valve needle 114 dictate the cross sectional area of magnetostrictive member 130.

While FIG. 1 shows magnetostrictive member 130, electric coil 132, and flux tube 134 could be replaced with a piezoelectric stack (not shown). Electrical fitting 136 could be employed to direct an electric voltage to the piezoelectric stack. When an electric voltage is applied to a piezoelectric stack, the stack expands and develops a motive force for opening injection valve 100.

As shown in FIG. 1, the actuator assembly may be located within valve housing 102 and disposed concentrically around valve stem 114a where it occupies a portion of the annular space between valve stem 114a and valve housing 102. Accordingly, the actuator assembly may be exposed to fuel that is directed through the hollow valve body on its way from inlet port 108 to nozzle orifice 110.

Hydraulic Link Assembly

The opening force generated by the actuator assembly is transmitted to valve needle 114 through a hydraulic link assembly. The hydraulic link assembly comprises hydraulic cylinder 160, which is disposed in close-fitting relationship around hydraulic piston 114b, which is free to move in the longitudinal direction within cylinder 160. As mentioned above, in the embodiment of FIG. 1, hydraulic piston 114b is an integral part of valve needle 114 and the side wall of cylinder 160 helps to guide the movement of valve needle 114 in the actuating direction. A viscous hydraulic fluid is sealed inside hydraulic cylinder 160 by cylinder cap 162 and seals 166, 168 and 169 (see FIG. 2). Seals 166 and 168 permit valve needle 114 to move relative to cylinder cap 162 and cylinder 160, respectively. Known seals may be employed, such as, for example elastomeric 0-ring seals, packing, metal seals, or diaphragm/bellow seals.

The diametrical clearance gap between the outside diameter of hydraulic piston 114b and the inside diameter of hydraulic cylinder 160 is extremely small (on the order of 50 to 250 microns). The desired size of the clearance gap is dependent on the viscosity of the chosen hydraulic fluid. The hydraulic flow in the clearance gap is governed by the Hagen-Poiseuille Flow and the hydraulic fluid and clearance gap are preferably selected so that the flow of hydraulic fluid through the gap is insignificant during the time span of fuel injection events when an opening force is transmitted through the hydraulic fluid. Furthermore, the hydraulic fluid preferably has a sufficiently high viscosity and bulk modulus so that it acts as an incompressible solid when activation of the actuator assembly causes a valve opening force to be quickly transmitted through the hydraulic fluid between the bottom of cylinder 160 and hydraulic piston 114b. For consistency of operation, the hydraulic fluid is also preferably an extremely stable fluid that maintains its desired properties over a wide range of temperatures (that is, within the expected operating temperatures inside cylinder 160). Suitable hydraulic fluids are, for example, conventional motor oil, such as grade 15W40, or synthetic lubricants such as Dupont® "Krytox®" grease which is available in a range of viscosities. Krytox® is a PerFluoroPolyEther (PFPE) synthetic lubricant that may be mixed with a thickener to form a grease. These types of hydraulic fluids also help to lubricate seals 166 and 168. Different injection valves may have different sized pistons and clearance gaps, so the hydraulic fluid may be selected with consideration to the characteristics of an individual injection valve design.

When injection valve 100 is closed and at rest, the closing force is transmitted through the hydraulic fluid held between cylinder cap 162 and hydraulic piston 114b. Typically, during engine operation, injection valve 100 is closed most of the time (normally over 90% of the time). Accordingly, there is enough time between injection events for the hydraulic fluid to redistribute itself by flowing through the clearance gap so that hydraulic cylinder 160 moves relative to piston 114b to automatically "re-zero" itself. The initial zero-position is the position of hydraulic piston 114b within hydraulic cylinder 160 after assembly of injection valve 100. The initial zero position may not be the same for all injectors due to variation in the length of components within manufacturing tolerances. Also, during operation, the zero-position auto-adjusts to change depending, for example, upon component wear or upon the effects of thermal expansion on the dimensional relationship between components.

Differential thermal expansion or contraction may be caused by differences in thermal expansion coefficients or uneven heat distribution between the components. Even though the components of injection valve 100, such as magnetostrictive member 130, valve needle 114, and valve housing 102, are designed to be reasonably matched to the thermal expansion rates of the other components, because the valve needle lift and the displacement of the components that causes the lift are so small, the effects of thermal expansion or contraction need to be taken into account to ensure the desired valve needle lift is achieved. The effects of thermal expansion and contraction may be amplified if the injection valve is exposed to a wide range of temperatures. For injection valves used in vehicles it would not be uncommon to expect a temperature range between −40° C. (in cold climates) and +125° C. (when the engine is running). An uneven temperature distribution may be the result of many factors, including, for example, the influence of (1) heat generated at coils 132; (2) magnetic hysteresis in the actuator assembly; and (3) heat transfer from the cylinder head or the combustion chamber via valve tip 106. If unaccounted for, the total effect of differential thermal expansion or contraction on the displacement of valve needle 114 may be greater than the targeted lift.

In summary, the hydraulic link assembly accounts for variations in component dimensions arising from the permitted tolerances in the manufacturing processes and the injection valve assembly methods. Therefore, the hydraulic link assembly reduces manufacturing costs by allowing the injection valve components to be manufactured to less exacting tolerances. In addition, during operation, the hydraulic link assembly auto-adjusts itself between injection events to account for changes in the dimensional relationship between injection valve components that may be caused, for example, by component wear or differential thermal expansion or contraction.

Summary of Operation

When injection valve 100 is at rest in the closed position, the closing force that biases valve needle 114 against valve seat 112 originates from needle spring 116. From needle spring 116, the closing force is transmitted through needle spring guide 118 to valve needle 114. It is preferable for the closing force to be provided by a mechanical spring member, such as the illustrated coil spring, so that the failure mode for injection valve 100 will be in the closed position. That is, if the actuating assembly is not energized or fails, injection valve 100 will remain in the closed position.

To initiate an injection event the actuator assembly is energized by directing an electric current to electric coil 132. A magnetic flux develops that flows through magnetostrictive member 130, poles 138, 140, and 142, and flux tube 134. Under the influence of the magnetic field, magnetostrictive member 130 expands in length (in the direction of the magnetic field). Since pole 138 is in a fixed position, magnetostrictive member 130 expands in the direction of hydraulic cylinder 160. An opening force, originating from expanding magnetostrictive member 130 is transmitted through inner pole 140, the base of cylinder 160, hydraulic fluid 164b (see FIG. 2), which is held between the base of cylinder 160 and a planar surface of hydraulic piston 114b, and finally, through piston 114b, which in the illustrated embodiment is integral with valve needle 114. The opening force is greater than the closing force, which results in compression of needle spring 116. The displacement of hydraulic cylinder 160 also causes further compression of disc spring 150.

As previously discussed, because valve actuation occurs suddenly (on the order of 200 $\mu$s), hydraulic fluid 164b does not have time to flow through the narrow clearance gap between piston 114b and hydraulic cylinder 160. Instead, hydraulic fluid 164b acts as a solid and transfers the movement of magnetostrictive member 130 to valve needle 114 via piston 114b, causing valve needle 114 to lift away from valve seat 112. Because injection valve 100 stays open for such a brief period (typically less than 3 milliseconds), as long as the viscosity of hydraulic fluid 164 is properly selected and the clearance gap is suitably sized, the flow of hydraulic fluid 164 through the clearance gap while injection valve 100 is open is insignificant so that any displacement caused by such flow is much less than the total displacement of valve needle 114.

The movement of valve needle 114 is guided near valve tip 106 by guide 180 (see FIG. 3). FIG. 3 shows annular space 182 disposed around valve stem 114a. Between injection events, fuel remains in annular space 182. When injection valve 100 is open, fuel flows through annular space 182, other gaps between valve components, and openings provided in certain valve components, which all cooperate to permit the free flow of fuel from inlet port 108 through to nozzle orifice 110 (which may be one of a plurality of nozzle orifices radially oriented from the nozzle throat). For example, FIGS. 1 through 3 show openings that provide fluid passages through components such as needle spring housing 122, lock nut 144, and pole 138. FIG. 3 also shows seal 184 between valve housing 102 and valve tip 106, and cylinder head face seal 186, which seals between injection valve 100 and the engine cylinder head (not shown).

As fuel flows through valve housing 102, the fuel cools the actuator assembly. The fuel flow path is preferably arranged to provide the greatest cooling to the internal diameter surface of electric coil 132 and the outer diameter surface of magnetostrictive member 130. In addition, a small percentage of the fuel flow, perhaps up to about 20%, may be directed to flow between the internal diameter of magnetostrictive member 130 and the surface of cylindrical valve stem 114a. When the fuel is used to cool the actuator assembly in this manner, thermal modeling predicts a temperature rise of less than 10° C.

To close injection valve 100, at the end of the injection event, electric coil 132 is de-energized, causing magnetostrictive member 130 to contract. When valve needle 114 is moving from the open position to the closed position, the closing force originates from needle spring 116 and disc spring 150. The closing force from needle spring 116 is again transmitted to valve needle 114 through needle spring guide 118. In the open position, the expanded magnetostrictive member 130 compressed disc spring 150, so upon closing, disc spring 150 de-compresses to push cylinder 160 down and to compress to magnetostrictive member 130. Disc spring 150 may also provide an additional closing force to valve needle 114 by generating a closing force that is transmitted from disc spring 150 through cylinder cap 162, hydraulic fluid 164a and hydraulic piston 114b.

When valve needle 114 moves from the open position to the closed position, the time that elapses is again typically less than 250 microseconds, and preferably less than about 200 microseconds so hydraulic fluid 164 again does not have time to flow through the clearance gap between piston 114b and cylinder 160. Consequently, pressure builds up in hydraulic fluid 164a on the upper planar surface of piston 114b.

Once valve needle 114 contacts valve seat 112, injection valve 100 is closed. When injection valve 100 is closed, the hydraulic link assembly automatically self-adjustments so that the position of hydraulic cylinder 160 relative to hydraulic piston 114b is corrected to account for the effects of temperature, wear, and any small movements of valve needle 114 relative to hydraulic cylinder 160 that may have occurred while valve needle 114 was in the open position. Auto-adjustments are accomplished by the migration of hydraulic fluid 164 from one side of hydraulic piston 114b to the other, while disc spring 150 ensures that hydraulic cylinder 160 and valve needle 114 remain in direct contact at all times.

Control Strategy

Figure 4:
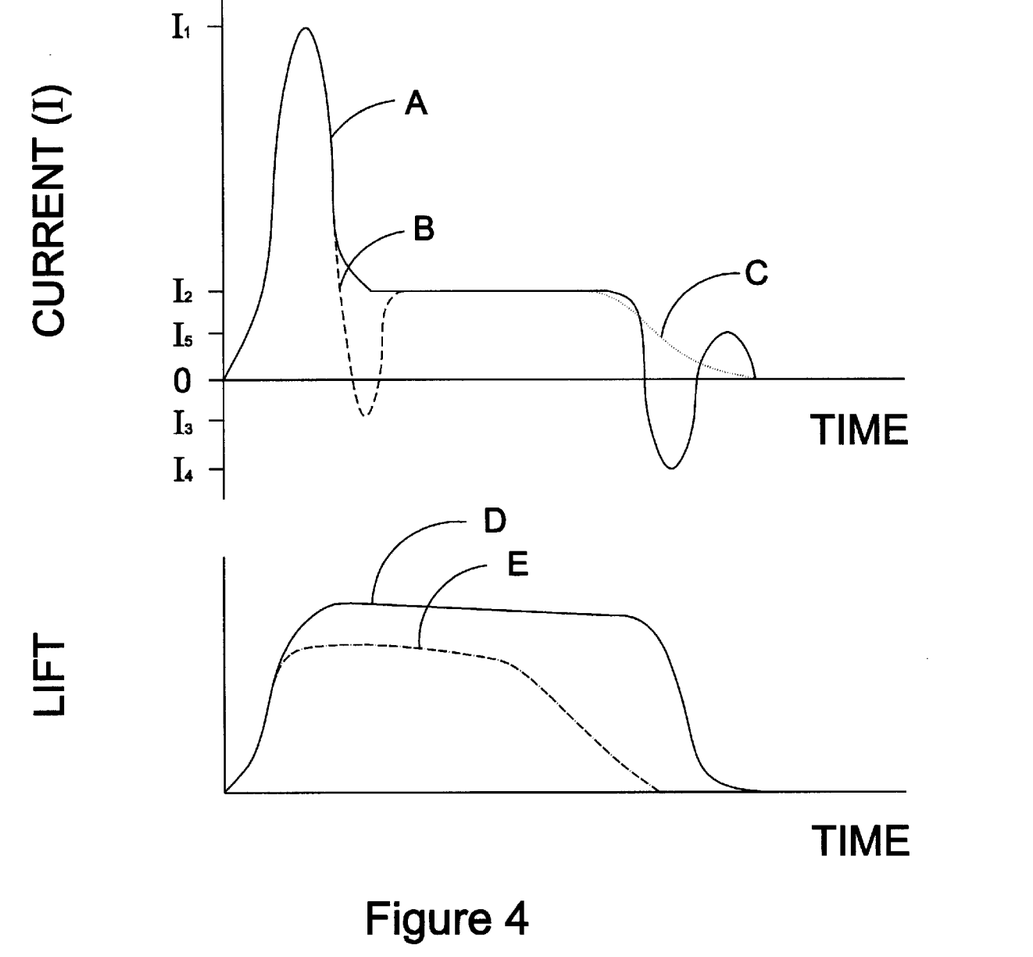
FIG. 4 is a timing diagram for a preferred method of controlling electric current applied to the actuator assembly of the fuel injection valve of FIG. 1.
Figure 5:
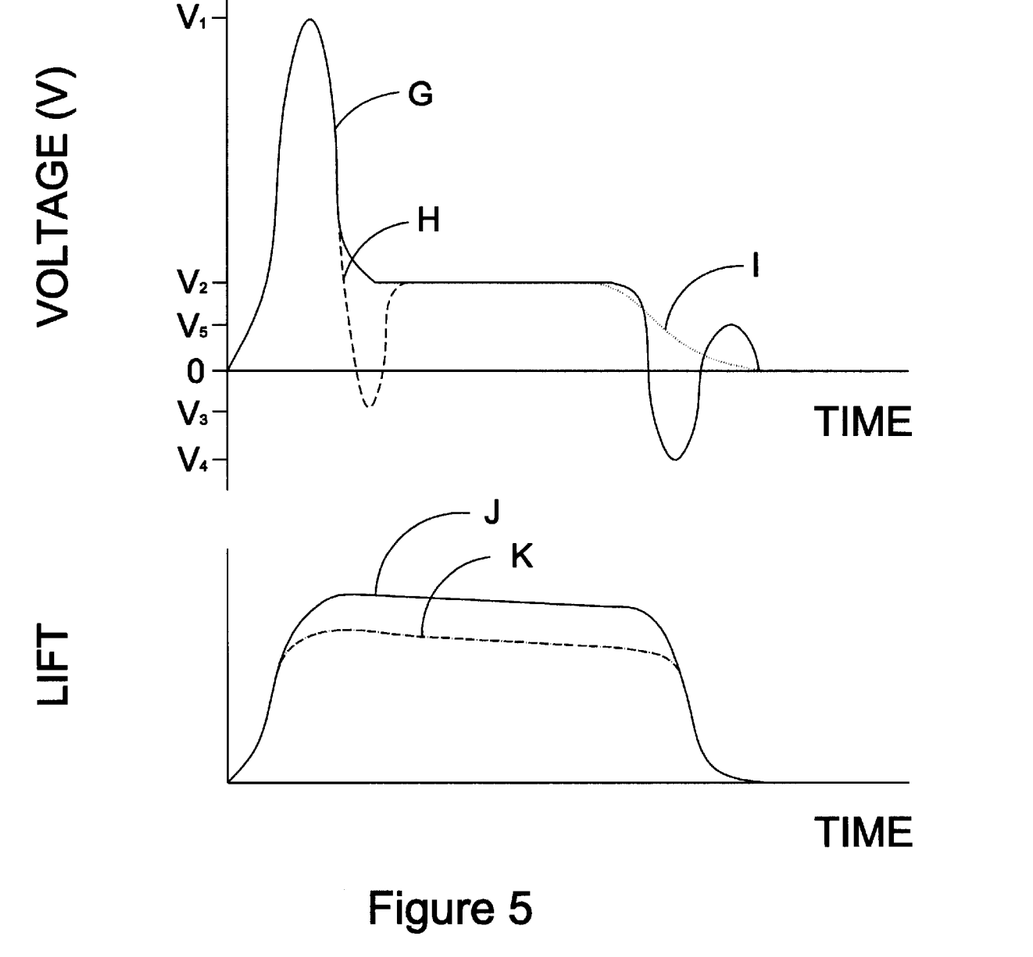
FIG. 5 is a timing diagram for a preferred method of controlling voltage applied to a piezoelectric actuator assembly for a fuel injection valve.

Waveforms for controlling a directly actuated injection valve and corresponding actuator displacements are plotted in the graphs shown in FIGS. 4 and 5. The illustrated waveforms show that the control pulse may employ several features to control the movement of a magnetostrictive or piezoelectric member respectively.

In FIG. 4, waveform A represents the electric current that is directed to an electric coil that is used to activate an actuator comprising a magnetostrictive member. The strength of the magnetic field is directly proportional to the amount of electric current that is directed to the electric coil. To promote fast opening, the current is preferably first spiked to current $I_1$ since higher currents yield stronger magnetic fields that can be employed to accelerate the expansion of the magnetostrictive member. The electric current is lowered to current $I_2$ during the main injection event.

Initial electric current $I_1$ corresponds to a current that may be as much as an order of magnitude higher than electric current $I_2$, which is the current that is actually required to fully open the injection valve. It is also possible to partially open the injection valve, for example, by reducing the current after the initial current spike to a value less than current $I_2$. As shown by dashed waveform B, which temporarily reverses the current to negative current $I_3$, the control pulse may be optionally shaped to lower the average current to a level that allows quick attainment of partial lift for better flow control than that which can be obtained purely through pulsewidth modulation. That is, better flow control can be achieved by controlling both the displacement of the valve needle (lift) and the duration of the injection event.

Valve closure may be optionally accelerated by initially reversing the current to negative current $I_4$. To reduce the impact and consequent wear of the valve needle when it makes contact with the valve seat, as shown by waveform A, the current may be momentarily increased to positive current $I_5$ to slow down the valve closing action. In an alternative method for controlling the impact of the valve needle on the valve seat, the current can be more gradually reduced without reversing the direction of current, as shown by dotted-line C. Finally, the injection event is completed when injection valve is closed and current is returned to zero.

Line graphs D and E show the displacement of the valve needle through respective fully open and partially open injection events. Graph D corresponds to the injection event controlled by waveform A. Graph D shows the valve needle quickly moving to the fully open position at the beginning of the injection event. In the illustrated example, the injection valve remains in the fully open position for the majority of the injection event, as represented by the essentially flat portion of graph D. However, depending upon the viscosity of the hydraulic fluid and the size of the clearance gap between the hydraulic piston and the hydraulic cylinder, the flat portion of graph D may have a slight slope caused by the flow of hydraulic fluid through the clearance gap during the injection event.

When the injection valve is closed, the closing action is very quick, as shown by the steep downward slope of line D near the end of the injection event. However, in response to the momentary positive current near the end of waveform A, the slope of graph D flattens out just as the valve is returning to the fully closed position, demonstrating how the shape of waveform A can be used to reduce wear caused by the impact of the valve needle on the valve seat. Graph E corresponds to a waveform (not shown) which, after the initial current spike reduces the current to a value less than current $I_2$, so that the injection valve is only partially opened. Graph E also shows that the duration of the injection event may be varied by changing the length or duration of the waveform. Compared to the injection event represented by graph D, the valve lift is smaller for the injection event represented graph E, so the initial current spike may be lower than the initial current spike of waveform A. The closing action represented by the more gradual slope of graph E (compared to the steeper slope of graph D), corresponds to a waveform having a shape similar to alternate waveform C.

Persons skilled in the art will recognize that the time required to open or close the injection valve may be decreased by increasing the slope of the control waveform, or increased, by decreasing the slope of the waveform. Thus the shape of the control waveform may be manipulated to produce the desired effects on the speed of the valve needle movement and its displacement with respect to the valve seat (to control lift).

In FIG. 5, waveform G represents a voltage control pulse that may be used to activate a piezoelectric actuator. As will become apparent, the preferred control strategy for piezoelectric actuators employs the same principles as the preferred control strategy described above for magnetostrictive actuators. To promote fast opening, the voltage is preferably first spiked to voltage $V_1$ since higher voltages can be employed to accelerate the expansion of piezoelectric materials. The voltage is lowered to voltage $V_2$ during the main injection event. Voltage $V_1$ corresponds to a voltage that may be as much as an order of magnitude higher than voltage $V_2$, which is the voltage that is actually required to fully open the injection valve. It is also possible to partially open the injection valve, for example, by reducing the voltage after the initial voltage spike to a value less than voltage $V_2$. As shown by dashed waveform H, which temporarily reduces the voltage to negative voltage $V_3$, the control pulse may be optionally shaped to lower the average voltage to a level that allows quick attainment of partial lift for better flow control than that which can be obtained purely through pulsewidth modulation. That is, better flow control can be achieved by controlling both the displacement of the valve needle (lift) and the duration of the injection event.

Valve closure may be optionally accelerated by initially reducing the voltage to negative voltage $V_4$. To reduce the impact and consequent wear of the valve needle when it makes contact with the valve seat, as shown by waveform G, the voltage may be momentarily increased to positive voltage $V_5$ to slow down the valve closing action. Similar to the shape of current waveform C, the shape of voltage waveform I represents an alternative method for reducing the impact of the valve needle on the valve seat upon closing. Finally, the injection event is completed when injection valve is closed and voltage is returned to zero.

Line graphs J and K show the displacement of the valve needle through respective injection events. Graph J corresponds to the injection event controlled by waveform G. Graph J shows the valve needle quickly moving to the fully open position at the beginning of the injection event. In the illustrated example, the injection valve remains in the fully open position for the majority of the injection event, as represented by the essentially flat portion of graph J. However, depending upon the viscosity of the hydraulic fluid and the size of the clearance gap between the hydraulic piston and the hydraulic cylinder, the flat portion of graph J may have a slight slope caused by the flow of hydraulic fluid through the clearance gap during the injection event.

When the injection valve is closed, the closing action is very quick, as shown by the steep downward slope of line J near the end of the injection event. However, in response to the momentary positive voltage near the end of waveform G, the slope of line J flattens out just as the valve is returning to the fully closed position, demonstrating how the shape of waveform G can be used to reduce wear caused by the impact of the valve needle on the valve seat. Graph K is similar to graph J except that it corresponds to a waveform (not shown) which, after the initial voltage spike reduces the voltage to a value less than voltage $V_2$, so that the injection valve is only partially opened.

The time span for the waveforms of FIGS. 4 and 5 may be in the range of 100 to 5000 microseconds, and typically between 250 and 2000 microseconds for the majority of injection events.

The combination of the above described directly actuated injection valve and control strategy provides several benefits, including:

elimination of the hydraulic fluid supply system that is needed by conventional hydraulically actuated injection valves. This simplifies injection valve construction, for example, by eliminating the need for hydraulic fluid supply and return passages and three way valves that are employed by conventional hydraulically actuated injection valves.

automatic compensation for differential thermal expansion within the injection valve, for wear due to prolonged operation, and for small differences caused by limitations in manufacturing tolerances.

a compact concentric valve needle/actuator assembly arrangement for accommodating an elongated magnetostrictive or piezoelectric member.

an apparatus that permits the use of a control strategy that can throttle fuel flow and reduce valve seat wear. The ability to control the lift displacement permits reduced injection at lower loads and reduced pre-mixed burning. For example, using a magnetostrictive or piezoelectric actuator, the valve needle movement can be controlled between about 10% and 100%. For lower load conditions it is important to be able to reduce the flow of fuel into the combustion chamber, since excess fuel may not be combusted, resulting in lower operating efficiency and higher emissions.

improved manufacturability is made possible by the use of axisymmetric cylindrical parts and few tight tolerances between the injection valve components.

valve operation is improved since the actuating assembly permits greater control of the valve needle. For example, the injection valve may be used to inject a gaseous or liquid fuel. When the fuel is gaseous, there is a greater need to slow down the valve needle upon closing because there is no liquid fuel to dampen the impact of the valve needle on the valve seat. By shaping the control pulse waveform applied to the actuator it is possible to slow down the closing of the injection valve to reduce impact on the valve needle and the valve seat.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. An injection valve for injecting fuel into a combustion chamber of an internal combustion engine, said injection valve comprising:
(a) a valve housing comprising:
a fuel inlet port;
an interior chamber fluidly connected to said fuel inlet port;
a nozzle comprising a nozzle orifice providing a fluid passage from said interior chamber to said combustion chamber;
(b) a valve needle disposed within said valve housing wherein said valve needle is movable between a closed position at which a sealing end of said valve needle contacts a valve seat to fluidly seal said interior chamber from said nozzle orifice, and an open position at which said sealing end of said valve needle is spaced apart from said valve seat whereby said interior chamber is fluidly connected with said nozzle orifice, wherein valve needle lift equals the distance traveled by said sealing end away from said valve seat;
(c) a needle sp ring associated with said valve needle, wherein said needle spring applies a closing force to said valve needle for biasing said valve needle in said closed position;
(d) a n actuator assembly associated with said valve needle, wherein said actuator assembly may be activated to apply an opening force to said valve needle stronger than said closing force, for moving said valve needle to said open position; and
(e) a hydraulic link assembly comprising a passive hydraulic link having a hydraulic fluid thickness through which said opening and closing forces are transmitted, whereby said hydraulic fluid acts substantially as a solid with said thickness being substantially constant while said actuator assembly is activated and wherein said thickness of said hydraulic link is adjustable while said actuator is not activated in response to changes in the dimensional relationship between components of said injection valve to maintain a desired valve needle lift upon activation of said actuator assembly.

2. The injection valve of claim 1 wherein said thickness of said hydraulic link is auto-adjustable while said actuator assembly is not activated in response to changes in said dimensional relationship caused by differential thermal expansion.

3. The injection valve of claim 2 wherein said thickness of said hydraulic link is auto-adjustable while said actuator assembly is not activated in response to changes in said dimensional relationship caused by wear to components of said injection valve.

4. The injection valve of claim 1 wherein said hydraulic link assembly comprises a fluidly sealed hydraulic cylinder that is fluidly sealed from said interior chamber, said hydraulic link assembly comprising a piston and said hydraulic fluid is disposed within said hydraulic cylinder.

5. The injection valve of claim 4 wherein said piston is an integral part of said valve needle.

6. The injection valve of claim 1 wherein said actuator assembly comprises a magnetostrictive member or a piezoelectric stack.

7. The injection valve of claim 1 wherein said actuator assembly comprises a magnetostrictive member, an electric coil disposed around said magnetostrictive member and a flux tube disposed around said electric coil.

8. The injection valve of claim 7 wherein said actuator assembly is disposed within said interior chamber.

9. The injection valve of claim 8 wherein said actuator assembly is tubular and disposed within an annular space around a cylindrical portion of said valve needle.

10. The injection valve of claim 9 wherein one end of said tubular actuator assembly is supported by a pole that is attached to said valve housing.

11. The injection valve of claim 6 wherein when said actuator assembly is controllable to control said desired lift to between 10 and 100 percent of maximum lift.

12. The injection valve of claim 11 wherein said lift is controllable by controlling the electric current directed or voltage applied to said respective magnetostrictive or piezoelectric actuator assembly.

13. The injection valve of claim 7 wherein said magnetostrictive member comprises a metal alloy comprising the elements terbium, dysprosium, and iron.

14. The injection valve of claim 6 wherein said valve needle is controllable to move between said open and closed positions in less than about 200 microseconds.

15. The injection valve of claim 6 further comprising a compression spring member for applying a compressive force to said magnetostrictive or piezoelectric member.

16. The injection valve of claim 15 wherein said compression spring member comprises at least one disc spring.

17. The injection valve of claim 1 wherein said fuel is a gaseous fuel.

18. The injection valve of claim 1 wherein said fuel is injected into said combustion chamber at a pressure greater than about 2000 psi (about 13.8 MPa).

19. The injection valve of claim 1 wherein said valve housing comprises a plurality of parts which are joined with each other to provide a fluidly sealed body.

20. The injection valve of claim 1 wherein said valve housing, said valve needle, and said actuator assembly, are selected from materials with similar thermal expansion coefficients to reduce changes in the dimensional relationship between said components caused by changes in temperature.

21. The injection valve of claim 17 wherein said hydraulic fluid is a liquid.

22. The injection valve of claim 17 wherein said hydraulic fluid is a liquid selected from the group consisting of motor oil and grease.

23. An injection valve for injecting fuel into a combustion chamber of an internal combustion engine, said injection valve comprising:
(a) a valve housing comprising:
a fuel inlet port;
an interior chamber fluidly connected to said fuel inlet port;
a nozzle comprising a valve seat and a nozzle orifice providing a fluid passage from said interior chamber to said combustion chamber;
(b) a valve needle comprising a cylindrical portion having a sealing end and a piston portion having a pre-load end, said valve needle disposed within said valve housing wherein said valve needle is movable between a closed position at which said sealing end contacts said valve seat to fluidly seal said interior chamber from said nozzle orifice, and an open position at which said sealing end is spaced apart from said valve seat whereby said interior chamber is fluidly connected with said nozzle orifice, wherein valve needle lift equals distance traveled by said sealing end away from said valve seat;

(c) a needle spring associated with said pre-load end of said valve needle, wherein said needle spring is compressed to apply a closing force to said valve needle for biasing said valve needle in said closed position;

(d) an actuator assembly that may be activated to apply an opening force to said valve needle that is stronger than said closing force, for moving said valve needle to said open position, said actuator assembly comprising:
a tubular magnetostrictive member disposed around said cylindrical portion of said valve needle;
an electrical coil disposed around said magnetostrictive member;
a flux tube disposed around said electrical coil; and
a support for said actuator assembly that acts as a pole and provides a fixed position for one end of said magnetostrictive member relative to said valve housing; and (e) a hydraulic link assembly comprising a sealed hydraulic cylinder disposed about said piston portion of said valve needle, a hydraulic fluid disposed within said hydraulic cylinder, wherein said opening and closing forces applied to said valve needle are transmitted through a thickness of said hydraulic fluid whereby said hydraulic fluid acts as a hydraulic link and said thickness is automatically adjustable in response to changes in the dimensional relationship between components of said injection valve to maintain a desired valve needle lift when said actuator assembly is activated.

24. The injection valve of claim 23 further comprising a compression spring member for applying a compressive force to said magnetostrictive member.

25. The injection valve of claim 23 wherein said magnetostrictive member comprises a metal alloy comprising the elements terbium, dysprosium, and iron.

26. A method of using a shaped waveform to control an injection valve that employs a magnetostrictive or piezoelectric actuator assembly, said method comprising, in sequence:

(a) initiating an injection event by applying a control pulse and accelerating valve opening by raising the value of said control pulse to a spike value that is greater than the value required for the desired lift;

(b) reducing said control pulse from said spike value to a value that is needed to provide said desired lift;

(c) reducing said control pulse to a negative value to accelerate valve closing;

(d) increasing said control pulse to a positive value to slow down valve closing to reduce the impact force of a valve needle on a valve seat; and (e) reducing said control pulse to zero to close said valve.

27. The method of claim 26 further comprising, after increasing said control pulse to said spike value, momentarily reducing said control pulse to a value that is lower than the value that is needed for the desired lift.

28. The method of claim 26 wherein said spike value is up to about an order of magnitude higher than the value needed for the desired lift.

29. The method of claim 26 wherein said control pulse is a modulated current directed to an electric coil of an actuator assembly that comprises a magnetostrictive member.

30. The method of claim 26 wherein said control pulse is a modulated voltage applied to a piezoelectric stack of an actuator assembly.

31. The method claim 26 wherein the time needed to move said valve needle between a closed position and a desired open position may be as short as about 172 microseconds.

32. The method claim 26 wherein the time needed to move said valve needle between a closed position and a desired open position may be as short as about 250 microseconds.

* * * * *

UNITED STATES PATENT AND TRADEMARK OFFICE
CERTIFICATE OF CORRECTION

PATENT NO.     : 6,298,829 B1
DATED           : October 9, 2001
INVENTOR(S)   : Alan B. Welch, Irawan Rahardja and Mike Hebbes It is certified that error appears in the above-identified patent and that said Letters Patent is hereby corrected as shown below:

<u>Title page,</u>
Item [56], Reference Cited, FOREIGN PATENT DOCUMENTS, please delete reference "2 321 278  9/1998  (EP)" and insert -- 2 321 501  7/1998  (GB) --. Also please add the following reference -- 0 869 278  10/1998  (EP) --.

Signed and Sealed this

Sixth Day of August, 2002

*Attest:*

JAMES E. ROGAN
*Attesting Officer*     *Director of the United States Patent and Trademark Office*